United States Patent [19]
Ayerst et al.

[11] Patent Number: 5,740,534
[45] Date of Patent: Apr. 14, 1998

[54] METHOD FOR DETERMINING AVAILABLE FREQUENCIES IN SELECTIVE CALL RECEIVERS

[75] Inventors: Douglas I. Ayerst, Delray Beach; Malik J. Khan, Lake Worth; Morris Moore, Wellington; Leonard E. Nelson, Boynton Beach; Kwok K. Choi, Coral Springs, all of Fla.

[73] Assignee: Motorola, Inc., Schaumburg, Ill.

[21] Appl. No.: 605,560

[22] Filed: Feb. 22, 1996

[51] Int. Cl.$^6$ .................. H04B 7/00; H04Q 7/00
[52] U.S. Cl. .............. 455/434; 455/38.1; 455/186.1
[58] Field of Search .................. 455/161.1, 161.2, 455/165.1, 166.1, 166.2, 185.1, 186.1, 38.1, 38.3, 34.1, 54.2, 62, 63, 54.1, 434, 515, 450, 455, 509, 516, 433, 435; 340/825.44

[56] References Cited

U.S. PATENT DOCUMENTS

| | | | |
|---|---|---|---|
| 5,020,130 | 5/1991 | Grube et al. | 455/38.1 |
| 5,101,508 | 3/1992 | Owaki | 455/186.1 |
| 5,206,855 | 4/1993 | Schwendeman et al. | 455/38.1 |
| 5,262,769 | 11/1993 | Holmes | 455/161.2 |
| 5,393,713 | 2/1995 | Schwob | 455/161.2 |
| 5,491,469 | 2/1996 | Schwendeman | 340/825.44 |
| 5,574,985 | 11/1996 | Yikotila | 455/186.1 |

*Primary Examiner*—Reinhard J. Eisenzopf
*Assistant Examiner*—Lester G. Kincaid
*Attorney, Agent, or Firm*—Keith A. Chanroo

[57] ABSTRACT

A selective call receiver (106) has a frequency synthesizer (708) for scanning a plurality of frequencies to determine a control channel to receive a signal and a receiver (704) for receiving the signal representative of an available frequency associated with a geographic region. The signal includes a channel identifier (404), a frequency assignment (406) and an active channel indicator (408). A processor (712) associates the channel identifier (404) with the frequency assignment (406) in response to the active channel indicator (408) indicating an available frequency of the geographic region and a memory (720) stores channel identifiers (404) associated with frequency assignments (406) designating available frequencies (408). The receiver (704) receives an address (333) and the channel identifier (404) on the control channel, a decoder (714) decodes the channel identifier (404) associated with the frequency assignment (406) to determine the available frequency where a message will be transmitted and the frequency synthesizer (708) switches to the available frequency indicated by the channel identifier (404) for receiving the message.

16 Claims, 6 Drawing Sheets

5,740,534

METHOD FOR DETERMINING AVAILABLE FREQUENCIES IN SELECTIVE CALL RECEIVERS

FIELD OF THE INVENTION

This invention relates in general to portable subscriber units, and more specifically to a method for determining frequencies available for communication in a selective call receiver.

BACKGROUND OF THE INVENTION

The coverage area of selective call radio communication systems has been growing steadily to the point where there are now nationwide systems in service and worldwide systems in development. As these selective call radio communication systems grow, a need to uniquely identify all selective call radios that are authorized to operate on a particular selective call radio communication system has resulted in the assignment of longer identification numbers, or addresses, to the selective call radios, as well as the provision for the longer identification numbers within the signaling protocols used in the systems to communicate with the selective call radios.

In addition to providing longer identification numbers, selective call protocols for selective call radio communication systems have typically provided only outbound (from system to selective call radio) communication in narrowband (12.5 to 50 kHz) radio channels and have evolved to where some protocols provide high speed (greater than 4800 bits per second) outbound information transfer using, e.g., a synchronous outbound protocol. The use of a synchronous outbound protocol improves the throughput by reducing the amount of air time used for bit and word synchronization of the receiver to the transmitted signal, and also improves battery savings in the selective call radios. Examples of high speed synchronous outbound protocols are the FLEX™ and ERMES (European Radio Message System) protocols that have identification numbers having lengths of 42 and 35 bits, respectively, to assure uniqueness of all selective call radios.

Another evolutionary advancement in selective call (paging) systems is the introduction of two way systems which transmit acknowledgment of an outbound message to an inbound channel (from selective call radio to system). The two-way systems can also transmit information other than acknowledgments to be communicated on the inbound channel. An example of a protocol for two way paging is the ReFLEX™ protocol, which is based on the FLEX™ protocol for the outbound channel protocol. In two way data radio communication systems, throughput is a primary design concern for both outbound and inbound information communication. Improved throughput allows more efficient use of limited radio spectrum and, generally, reduced latency (delay of delivery of the information). Another primary design concern in two way data radio communication systems is reduced power consumption of portable selective call radios. The use of lengthy identification numbers in both the outbound and inbound channels of a two way radio communication system increases the message lengths of the messages in both the inbound and outbound channels.

To further aggravate the problem, because there is limited radio spectrum available worldwide or nationwide, to provide seamless communication to and from the selective call radios, it is necessary to equip the selective call radios with frequency synthesizers to enable them to scan through a list of frequencies when the selective call radio are roaming or has lost its signal to determine another frequency for communication. Since the number of frequencies used in a nationwide and/or worldwide system(s) can be exhaustive, the list of frequency to be scanned has to be chosen judiciously, e.g., not too many frequencies in the list, to enable the selective call radios to always be able to find a frequency on which they can receive information before their battery save routines are destroyed. Once this reference or default frequency is located, the selective call radios can be directed to another frequency by the system for further communication.

Also, because throughput is of great consideration in these nationwide or worldwide systems, the systems need to efficiently communicate the frequencies that are available for communication in its particular geographic region. It is appreciated that some of the available frequencies can be frequencies outside the scanning list of frequencies because the scanning list of frequencies cannot be too long else the battery saving routines would be destroyed before the selective call radios could locate an available frequency on which to receive information. Therefore, the selective call systems have to communicate the available frequencies in as few bits as possible to enable the selective call radios to quickly find or determine the available frequencies.

Thus, what are needed is a selective call system that efficiently communicates the available frequencies to selective call radios, and selective call radios that are able to receive the available frequencies and to acquire any of such available frequency although any of such available frequencies may not be one of the frequencies of list of frequencies.

DESCRIPTION OF A PREFERRED EMBODIMENT

Figure 1:
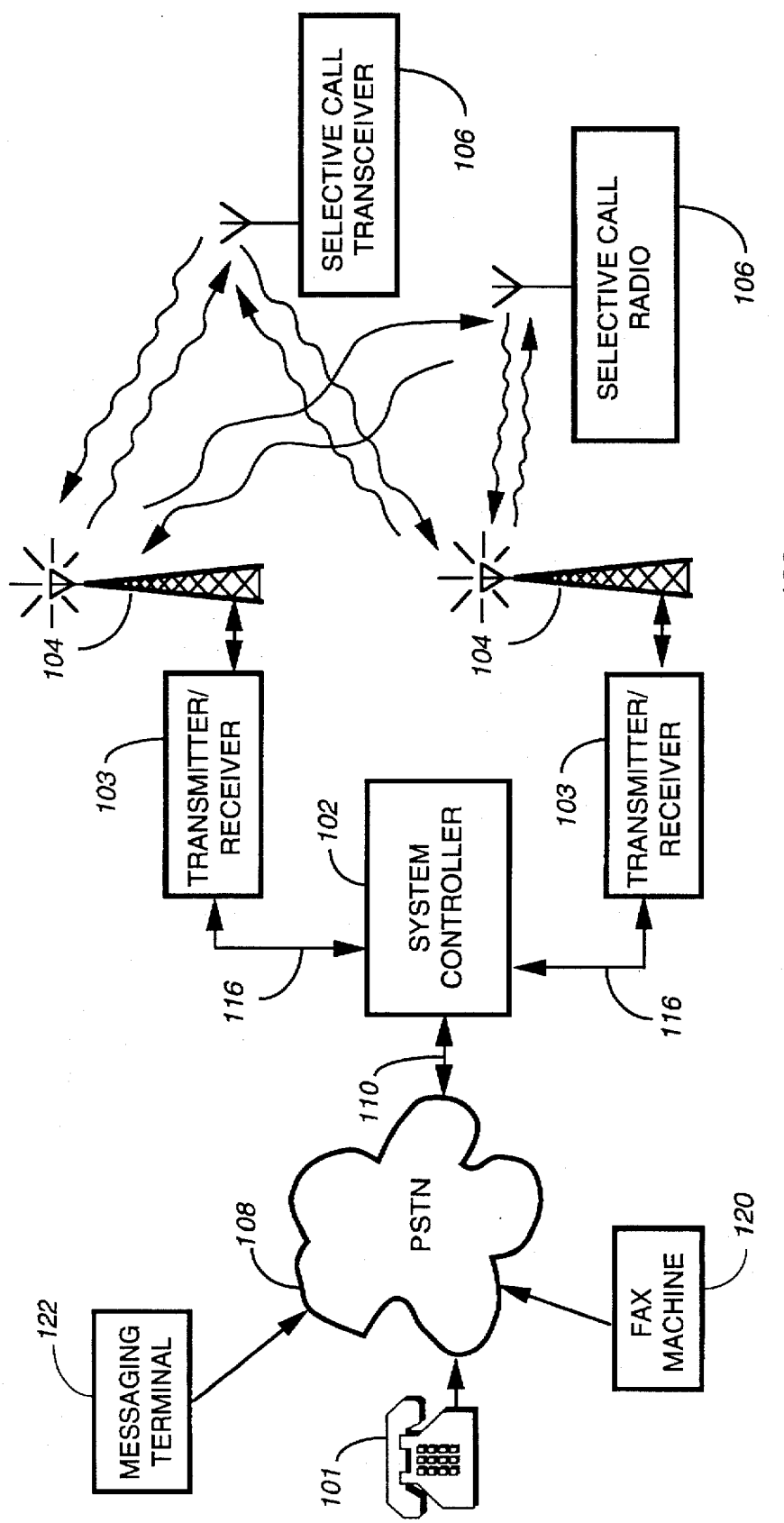
FIG. 1 is an electrical block diagram of a radio communication system, in accordance with the preferred embodiment of the present invention.

Referring to FIG. 1, an electrical block diagram of a radio communication system 100 is shown in accordance with the preferred embodiment of the present invention. The radio communication system 100 preferably comprises a selective call system further comprises a message input device, e.g., a conventional telephone 101, a facsimile machine 120 or a messaging terminal 122, connected through a conventional public switched telephone network (PSTN) 108 by conventional telephone links 110 to a system controller 102. The system controller 102 oversees the operation of a plurality of radio frequency transmitter/receivers 103 through one or more communication links 116 that typically are twisted pair telephone wires, and additionally can be radio frequency (RF), microwave, or other high quality audio communication links. The system controller 102 encodes and decodes inbound and outbound telephone addresses into formats that are compatible with land line message switch computers. The system controller 102 also functions to digitally encode and schedule outbound messages that include such information as digitized audio messages, numeric messages, alphanumeric messages, and response commands, for transmission by the radio frequency transmitter/receivers 103 to a plurality of selective call receivers with or without acknowledgeback capabilities (or transceivers) 106. The system controller 102 further functions to decode inbound messages, including unsolicited and response messages, received by the radio frequency transmitter/receivers 103 from the plurality of selective call transceivers 106. Examples of response messages are acknowledgments and designated response messages. An acknowledgment is a response from a selective call receiver to an outbound message initiated at the system controller 102. An example of an outbound alphanumeric message intended for a selective call transceiver 106 is a message entered from the telephone 101. The acknowledgment indicates successful reception of the outbound message. A designated response message is a message sent from a selective call transceiver in response to a command included in an outbound message from the system controller 102. An example of a designated response message is a message initiated by the selective call transceiver 106, but which is not transmitted until after a designated response is received from the system controller 102. The designated response command, in turn, is sent by the system controller 102 after an inbound message requesting permission to transmit the designated response message is communicated from the selective call transceiver 106 to the system controller 102. The response messages are preferably transmitted at a time designated within the outbound message or command, but alternatively can be transmitted using a non-scheduled protocol, such as the "Aloha" or slotted "Aloha" protocol, which are well known to one of ordinary skill in the art. An unsolicited message is an inbound message transmitted by a selective call transceiver 106 without having received an outbound message which requires a response. An example of an unsolicited message is an inbound message from a selective call transceiver 106 which alerts the radio communication system 100 that the selective call transceiver 106 is within radio range of the radio communication system 100. An unsolicited message can include a request to transmit a designated response and can include data such as numeric, alphanumeric, fax, or digitized voice data. Unsolicited messages are transmitted using the "Aloha" or slotted "Aloha" protocol. The inbound and outbound messages are included in outbound radio signals transmitted from, and inbound radio signals received by, a conventional antenna 104 coupled to the radio frequency transmitter/receiver 103.

It should be noted that the system controller 102 is capable of operating in a distributed transmission control environment that allows mixing conventional cellular, simulcast, satellite, or other coverage schemes involving a plurality of radio frequency transmitter/receivers 103, conventional antennas 104, for providing reliable radio signals within a geographic area as large as a worldwide network.

It will be appreciated that each of the selective call transceivers 106 is one of a class of radio terminal devices such as pagers having acknowledge back capability, conventional mobile and portable cellular telephones, mobile data radio terminals, mobile cellular telephones having attached data terminals, and mobile radios (trunked and non-trunked) having data terminals attached. Each of the selective call transceivers 106 assigned for use in the radio communication system 100 has at least one address assigned thereto which is a unique selective call address. The selective call address enables the transmission of a message from the system controller 102 only to the addressed selective call transceiver 106.

Figure 2:
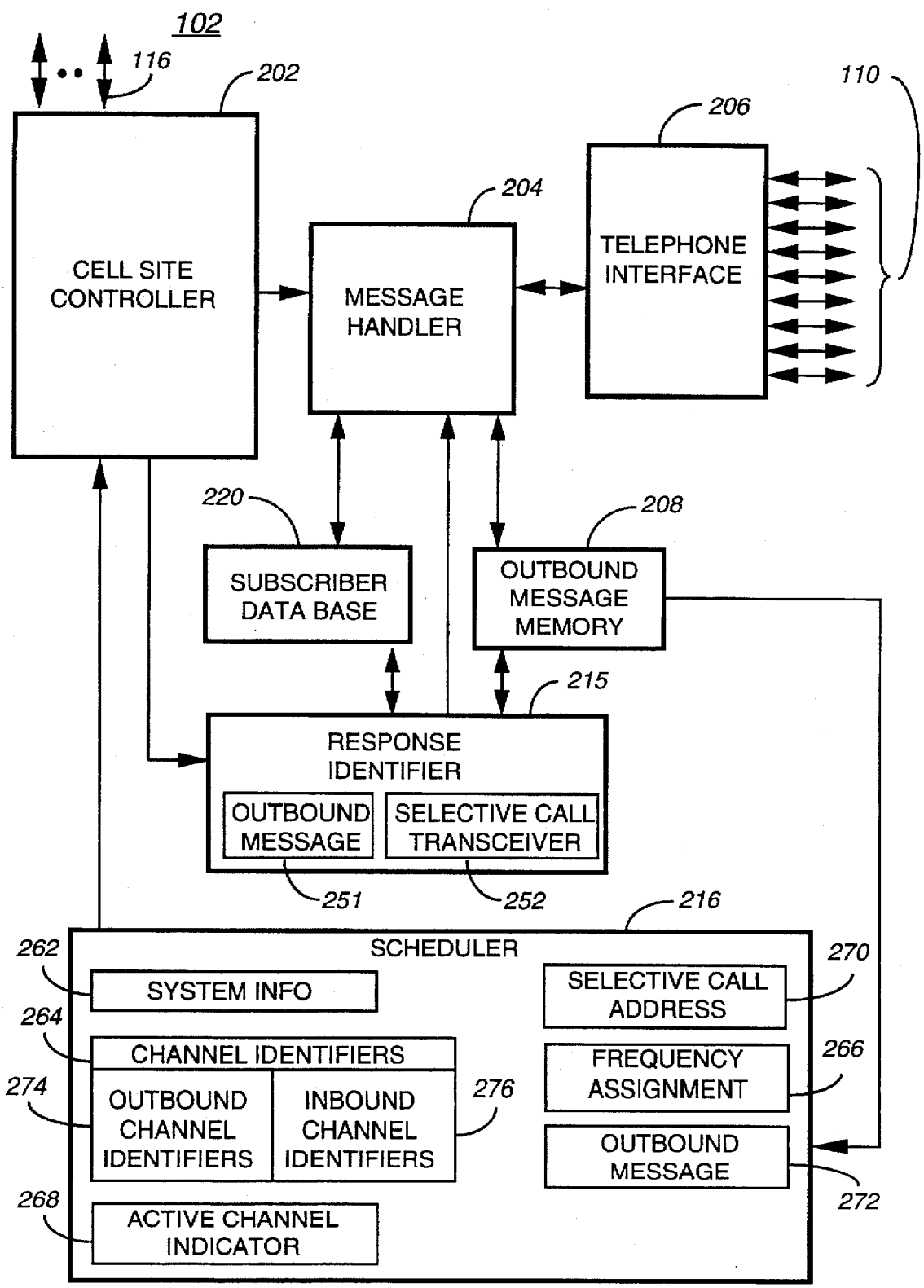
FIG. 2 is an electrical block diagram of a system controller according to FIG. 1.

Referring to FIG. 2, an electrical block diagram of the system controller 102 is shown in accordance with the preferred embodiment of the present invention. The system controller 102 comprises a cell site controller 202, a message handler 204, an outbound message memory 208, a subscriber data base 220, a telephone interface 206, a response identifier 215, and a scheduler 216. The cell site controller 202 is coupled to the radio frequency transmitter/receivers 103 (FIG. 1) by the links 116. The cell site controller 202 encodes channel identifiers (outbound and inbound or forward and reverse), frequency assignments, active channel indicators, selective call addresses and outbound messages to the transmitter/receivers 103 and controls the transmitter/receivers 103 to transmit transmission cycles including system configuration information specifying channels identifiers, frequency assignments, active channel indicators on a control channel. A control channel is one of the available frequency channels that is active for receiving address and system configuration information in a geographic region. When a message is directed to a selective call radio, the site controller 102 transmits the selective call addresses and the channel identifiers on the control channel which indicate the frequency of the outbound message, and for a two-way selective call radio, a reverse channel identifier is also transmitted to indicate the frequency of the inbound message. The channel identifiers comprise outbound (forward) and inbound (reverse) channel identifiers identifying both outbound and inbound frequencies, respectively. The inbound messages are received by the transmitter/receivers 103 and coupled to the cell site controller 202. The message handler 204 routes and processes messages received via the telephone interface 206, the subscriber data base 220, and the outbound message memory 208. The telephone interface 206 handles the switched telephone network 108 (PSTN) (FIG. 1) physical connection, connecting and disconnecting telephone calls at the telephone links 110, and routing the audio signals between the telephone links 110 and the message handler 204. The subscriber data base 220 stores information for each subscriber, including a correlation between a selective call address assigned to each selective call transceiver 106 and the telephone number used within the PSTN 108 to route messages and telephone calls to each selective call transceiver 106, as well as other subscriber determined preferences, such as hours during which messages are to be held back from delivery to the selective call transceiver 106. The subscriber data base 220 also stores, for each subscriber, information relating to whether the selective call radio is a selective call receiver or a selective call transceiver. The outbound message memory 208 stores a queue of messages which are queued for delivery to at least one of the plurality of selective call transceivers 106. For example, each message of the queue of messages is associated with a selective call address and forward and reverse channel identifiers for one of the plurality of selective call transceivers 106 for which each message is intended. The scheduler 216, which is coupled to the outbound message memory 208 and the cell site controller 202, schedules outbound messages and the selective call addresses associated therewith within a transmission cycle. In accordance with the preferred embodiment of the present invention, the scheduler 216 comprises system information 262, channel identifiers 264, frequency assignments 266 associated with each channel identifier 264, active channel indicators 268, selective call address element 270 and an outbound message element 272. The channel identifier 264 includes a channel identifier for an outbound message (outbound channel identifier) 274 and a channel identifier for an inbound message (inbound channel identifier) 276 according to the preferred embodiment each comprises three-bits of information while the channel assignments comprise eleven-bits of information. The channel identifier 264, e.g., each outbound channel identifier 274 is associated with an outbound (outgoing) frequency generally represented as an eleven-bits value and each inbound channel identifier 276 is associated with an inbound (incoming) frequency generally represented as an eleven-bit value. The response identifier 215, which is coupled to the cell site controller 202, the subscriber data base 220, the message handler 204, and the outbound message memory 208, comprises a selective call transceiver element 252 which identifies inbound (incoming) messages as being associated with one of the selective call transceivers in the subscriber data base 220 and comprises an outbound message element 251 which identifies response messages as being associated with one of the outbound messages in the outbound message memory 208. The response identifier 215 routes the identified messages to the message handler 204 for further processing of the messages. As one example of an operation of the system controller 102, the delivery of an outbound message stored in the outbound message memory 208 is completed when the outbound message has been communicated to the intended selective call transceiver 106, a message response is communicated back to the system controller 102 from the selective call transceiver 106, and the message response is identified by the outbound message element 251 of the response identifier 215 as being a response message generated specifically for the outbound message. In this example, the message handler 204 notifies the originator that the message has been received at the selective call transceiver 106.

The system controller 102 is preferably a model MPS2000® selective call terminal manufactured by Motorola, Inc., of Schaumburg, Ill., modified with special firmware elements in accordance with the preferred embodiment of the present invention, as described herein. The cell site controller 202, the message handler 204, the telephone interface 206, the outbound message memory 208, the subscriber data base 220, the scheduler 216, and the response identifier 215 are preferably implemented within portions of the model MPS2000® selective call terminal which include, but are not limited to those portions providing program memory, a central processing unit, input/output peripherals, and a random access memory. The system controller alternatively could be implemented using a model E09PED0552 PageBridge® paging terminal manufactured by Motorola, Inc., of Schaumburg, Ill. The subscriber data base 220 and the outbound message memory 208 can alternatively be implemented as magnetic or optical disk memory, which can alternatively be external to the system controller 102.

Referring to FIGS. 3–6, timing diagrams illustrating features of the transmission format of an outbound signaling protocol utilized by the radio communication system of FIG. 1 for transmitting messages on a designated frequency is shown in accordance with the preferred embodiment of the present invention. The signaling protocol is preferably the ReFLEX™ protocol which is a synchronous outbound signaling protocol.

Figure 3:
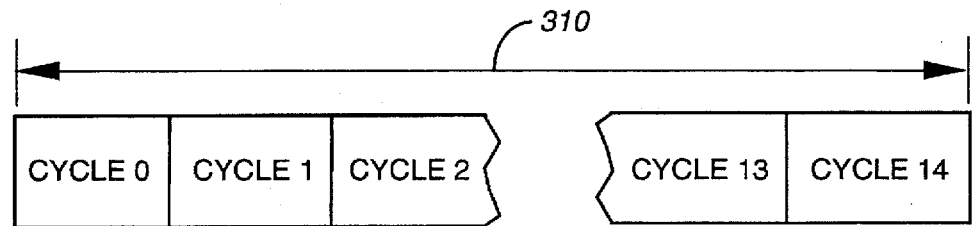
FIGS. 3–6 are timing diagrams illustrating the transmission format of an outbound signaling protocol utilized by the radio communication system of FIG. 1 to transmit a message on a designated frequency in accordance with the preferred embodiment of the present invention.
Figure 4:
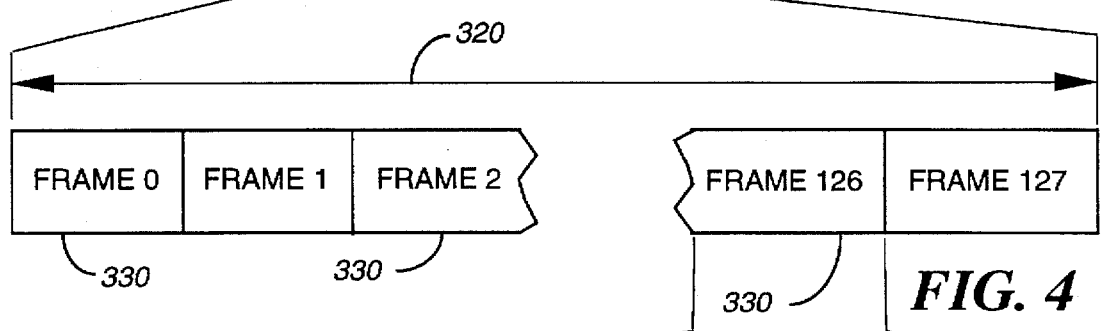
Figure 5:
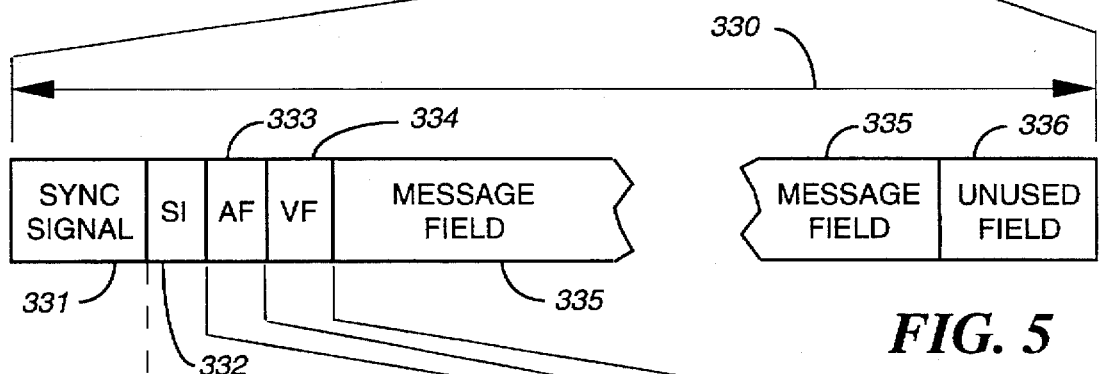
Figure 6:
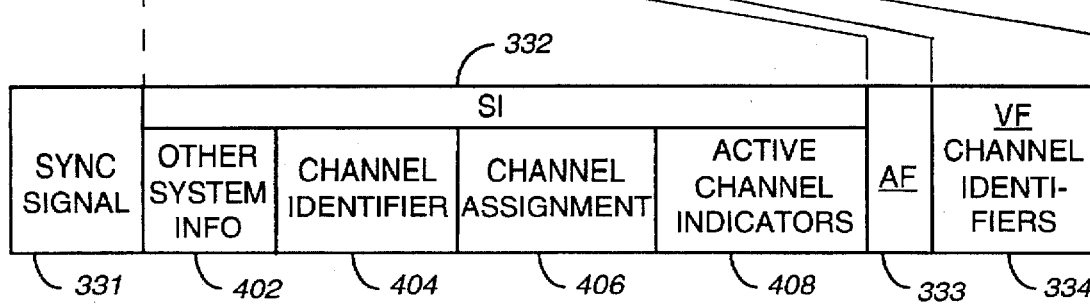

Referring to FIG. 3, the signaling protocol is subdivided into protocol divisions representing a time period of an hour 310. Each hour 310 is subdivided in fifteen cycles 320. Each of the fifteen cycles represents an uniquely identified cycle of four minutes time period transmitted in each hour 310. Further reference to FIG. 4 illustrates each cycle 320 subdivided into one-hundred-twenty-eight (128) frames 330, each of the one hundred twenty eight frames is a 1.875 second uniquely identified frame that is transmitted in each of the cycles 320. Referring to FIG. 5, each frame comprises a synchronization signal 331 lasting one hundred fifteen milliseconds and eleven one hundred sixty millisecond uniquely identified blocks are transmitted in each of the frames 330. Information is included in each frame 330 as system information field (SI) 332 comprising information, e.g., as illustrated in FIG. 6 according to the preferred embodiment of the present invention, other system information 402, channel identifiers 404, channel assignments 406 and active channel indicators 408. Each frame also includes one or more selective call addresses in an address field (AF) 333, one or more vectors in a vector field (VF) 334, one or more outbound messages in a message field 335, and an unused field 336 having no useful information therein. Referring to FIG. 6, each vector in the VF 334 corresponds to one of the addresses in the address field 333 and includes a channel identifier preferably including an outbound channel identifier indicating the frequency on which the outbound message will be transmitted and an inbound channel identifier indicating the frequency on which the selective call radio will transmit its inbound message or response. Referring back to FIG. 5, each outbound message is encoded in the message field 335 corresponding to one of the address in the address field 333.

Figure 7:
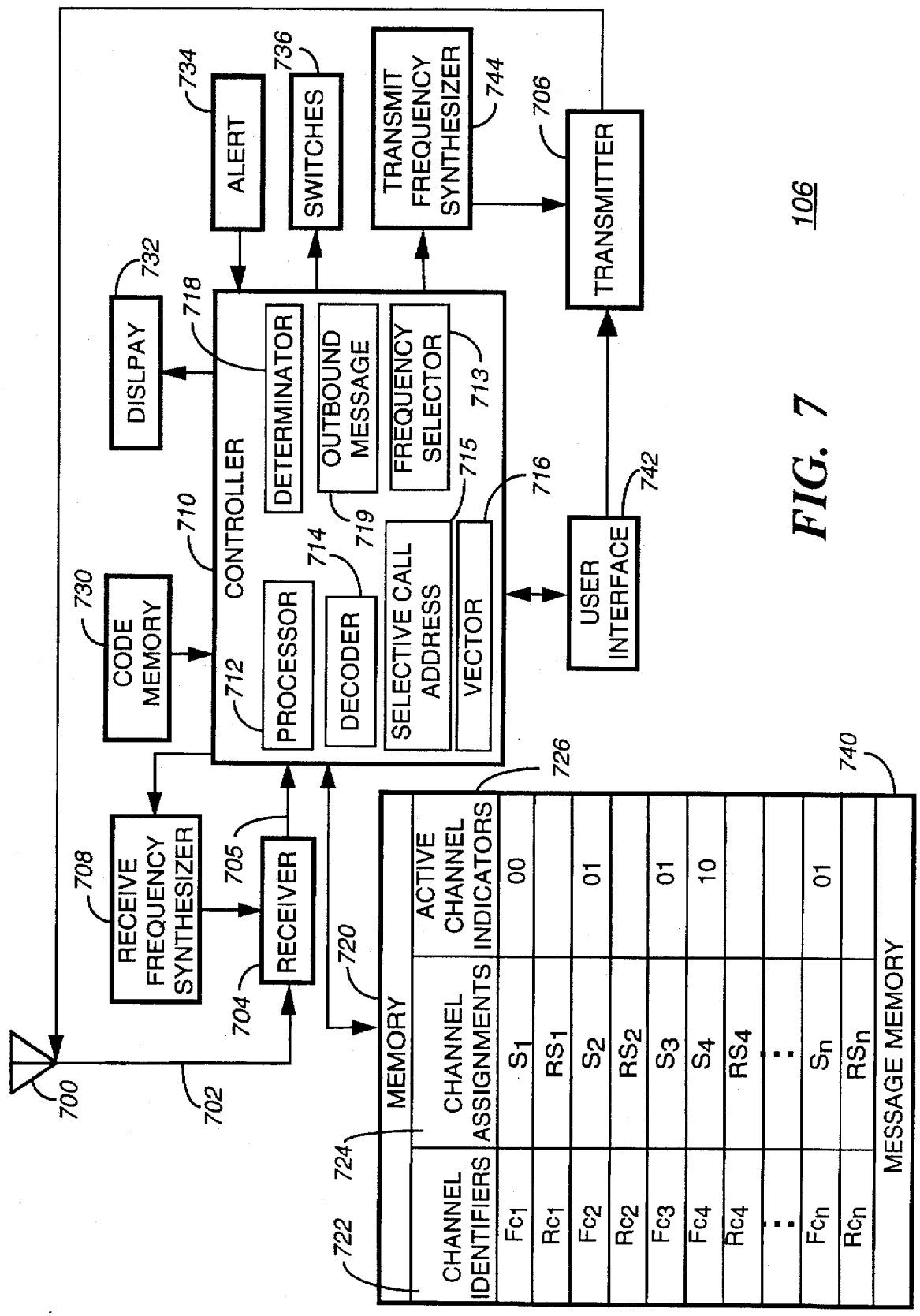
FIG. 7 is an electrical block diagram of a selective call receiver with acknowledge back capability in accordance with the preferred embodiment of the present invention.

In this way, the radio communication system periodically transmits system configuration information including the outbound and inbound channel identifiers associated with outbound and inbound channel assignments and the active channel indicators associated with the outbound channels. The selective call transceiver or radio, e.g., after it has roamed to a new geographic area, will scan through its frequency list until it finds a control channel where it will receive the system configuration information which will be stored. The selective call transceiver will associate the channel identifiers (3 bits) with the frequency assignments (11 bits) and, subsequent to receiving its address, it will receive the channel identifier which determines the frequency on which the message will be sent because the channel identifier is associated with the channel assignment (frequency). This system can therefore improve throughput by transmitting the channel identifier (3 bit number) to specify the frequency or channel assignment (11 bit value) since the selective call radio has already received the available frequencies and has associated them with the channel identifiers. Referring to FIG. 7, an electrical block diagram of a selective call radio (or transceiver) 106 with inbound message capability is shown in accordance with the preferred embodiment of the present invention. A portable communication units preferably a selective call transceiver (or receiver with acknowledgeback capability) 106 includes an antenna 700 for intercepting and transmitting radio signals. The intercepted signal 702 comprises a predetermined frame 330 of a cycle 320 of the ReFLEX™ protocol including, for example, selective call system configuration information 332 including, channel identifiers 404, channel assignments 406, channel indicators 408, selective call addresses 333, vectors 334 including channels identifiers and outbound messages 335. The channel identifiers include both outbound and inbound channel identifiers associated with outbound and inbound channel assignments. The antenna 700 is coupled to a receiver 704 and a transmitter 706. The intercepted signal 702 is coupled to the receiver 704 which receives the intercepted signal 702. The receiver 704 generates a demodulated signal 705 which is coupled to a controller 710. The controller 710 is coupled to a code memory 730 which stores addresses assigned to the selective call transceiver 106 and a predetermined list of frequencies for enabling the selective call transceiver to scan though until a control channel is located upon power-up or when the selective call transceiver has roamed to another geographic region. A frequency selector 713 of the controller 710 retrieves, e.g., each frequency sequentially from the list of a plurality of predetermined frequency channels until a channel is found to be active within the geographic region. The controller 710 further comprises a processor 712 for processing the demodulated signal 705, and decoder 714 coupled to the processor 712 decodes the channel identifiers, the channel assignments and active channel indictors. The processor 712 associates channel identifiers with the frequency assignments in response to active channel indicators corresponding to available frequencies or available frequency channels associated with the current geographic region. The controller stores the information decoded from the system configuration information in a memory 720. The information being stored comprises the channel identifiers stored in location 722 as the outbound channel identifiers, $Fc_{1-N}$, and the inbound channel identifiers, $Rc_{1-N}$, the channel assignments in location 724 as the outbound channel assignments, $S_{1-N}$, and the inbound channel assignments, $RS_{1-N}$, and active channel indicators in location 726. The corresponding active channel indicator 726 is retrieved, and in this case has "01" value which indicates an active outbound channel, while a value of "10" indicates an active channel in another geographic region, for example an adjacent geographic region, and a value of "00" indicates a data only channel (unavailable as a control channel). The controller further comprises selective call address element 715, a vector element 716, a determinator 718, an outbound message element 719 and the frequency selector 713, the functions of which will be described with more details below.

When the selective call address element 715 determines that its address is received on the control channel, the vector element 716 receives the 3 bit channel identifier encoded in the VF 334 portion of the protocol and a determinator 718 compares it with the channel identifiers stored in memory 720. When a comparison is found in response to the active channel indicator value of "01", the corresponding frequency assignment, e.g., $S_2$, associated with the channel identifier, e.g., $F_{c2}$, is retrieved and a frequency selector 713 sets the frequency for the receive frequency synthesizer 708 to switch to the $S_2$ frequency associated with the received channel identifier $F_{c2}$ for receiving the outbound message. The channel assignment and the outbound message element 719 identify the positions in the frame 330 where the outbound messages is being transmitted. When any outbound selective call address is received, the controller 710 generates an alert signal via an alert 734 and when the corresponding outgoing message is received, it is stored in a message memory portion 740 of the memory 720. Switches 736 is manipulated to display the messages on a display 732.

A message or response to the outgoing message can be transmitted by selecting or inputting the information from a user interface 742, the message is generated by the controller 710 which determines if an incoming channel identifier was sent with the outbound (outgoing) message that was received. When an inbound channel identifier was received, the controller retrieves the inbound frequency assignment from memory. If no channel identifier was received with the outgoing message, the controller retrieves the inbound (incoming) channel assignment associated with the outbound channel assignment on which the outbound message was received. The frequency selector 713 couples to a transmit frequency synthesizer 744 which sets the frequency of the transmitter 706 to transmit the inbound message from the selective call transceiver.

The outgoing (forward) channel assignment 11 bit number is used in a formula to calculate the outbound channel frequency. Variables to the formula comprises a base frequency, a frequency spacing, and a channel assignment number. The numbering scheme accommodates channel spacings of, e.g., 12.5 kHz, 25 kHz, and 50 kHz; as well as, the 6.25 kHz subchannel spacings used for InFLEXion™, the two-messaging protocol. The 6.25 kHz subchannel always falls at the center of a outgoing channel regardless of channel bandwidth, therefore by using a frequency offset of 6.25 kHz, a base frequency of 929.00625 MHz, and an 11 bit channel number, any channel or subchannel between 929 and 941 MHz can be specified with the channel assignment number. The formula used to calculate the subchannel or channel frequency is as follows:

ChFreq=((BaseFreq)+Channel Assignment*(FreqSpace))

BaseFreq=929.00625 MHz

FreqSpace=6.25 kHz

Given the channel frequency, the above formula is reordered to calculate the channel assignment number.

Channel Assignment=(ChFreq−BaseFreq)/(FreqSpace)

For example, suppose it is necessary to specify the frequency 940.025 MHz, then the channel assignment number is calculated as follows:

Channel Assignment=(940.025−929.00625)/(0.00625)=1763= 11011100011

The inbound (reverse) channel assignment number is used similarly to calculate the inbound channel frequency, however, the inbound channel frequency possibilities cover the range from 896.0125 MHz to 901.99375.

Figure 8:
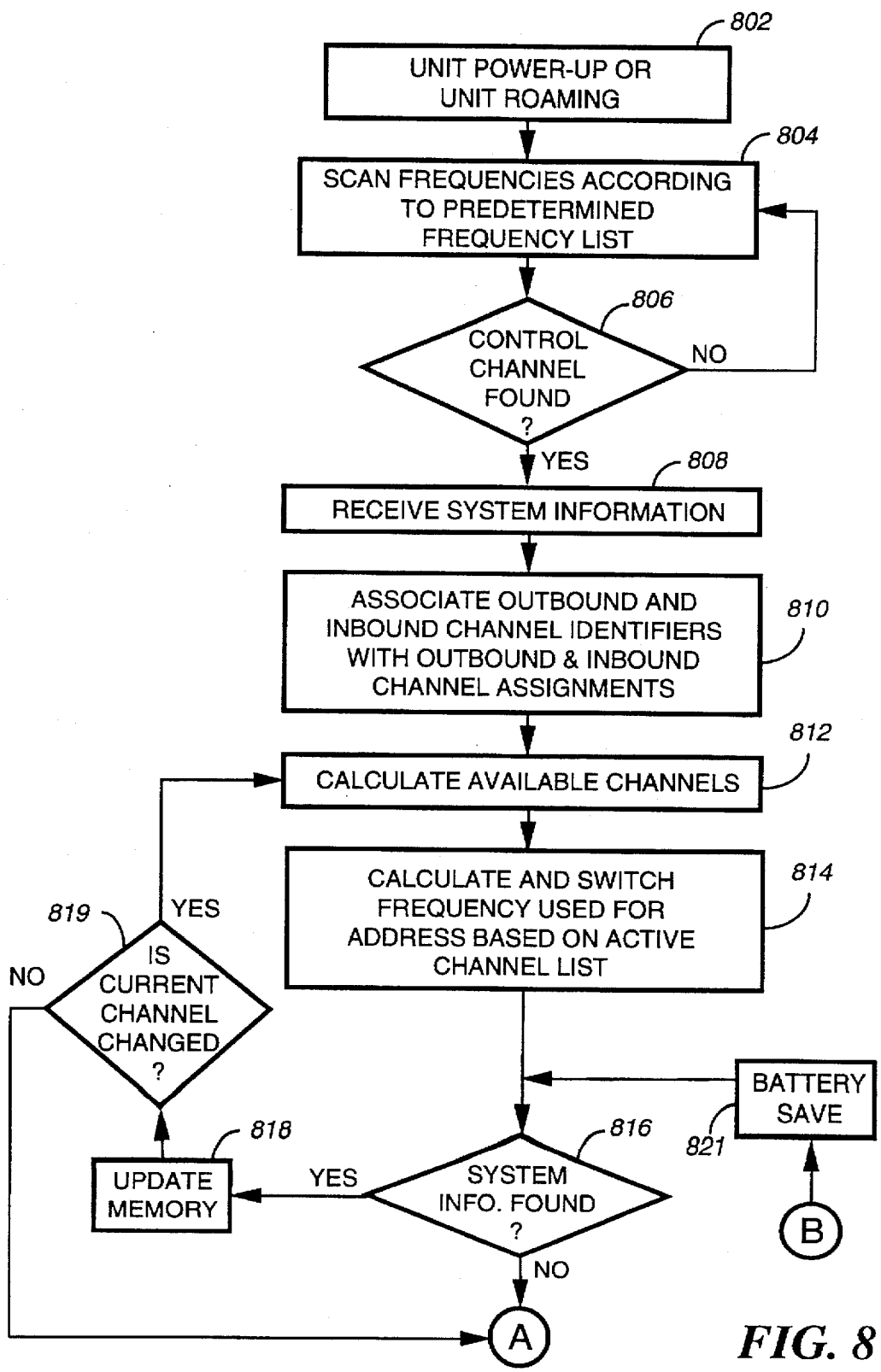
FIGS. 8 and 9 are flow charts illustrating a method for determining available frequencies for communication in accordance with the preferred embodiment of the present invention.
Figure 9:
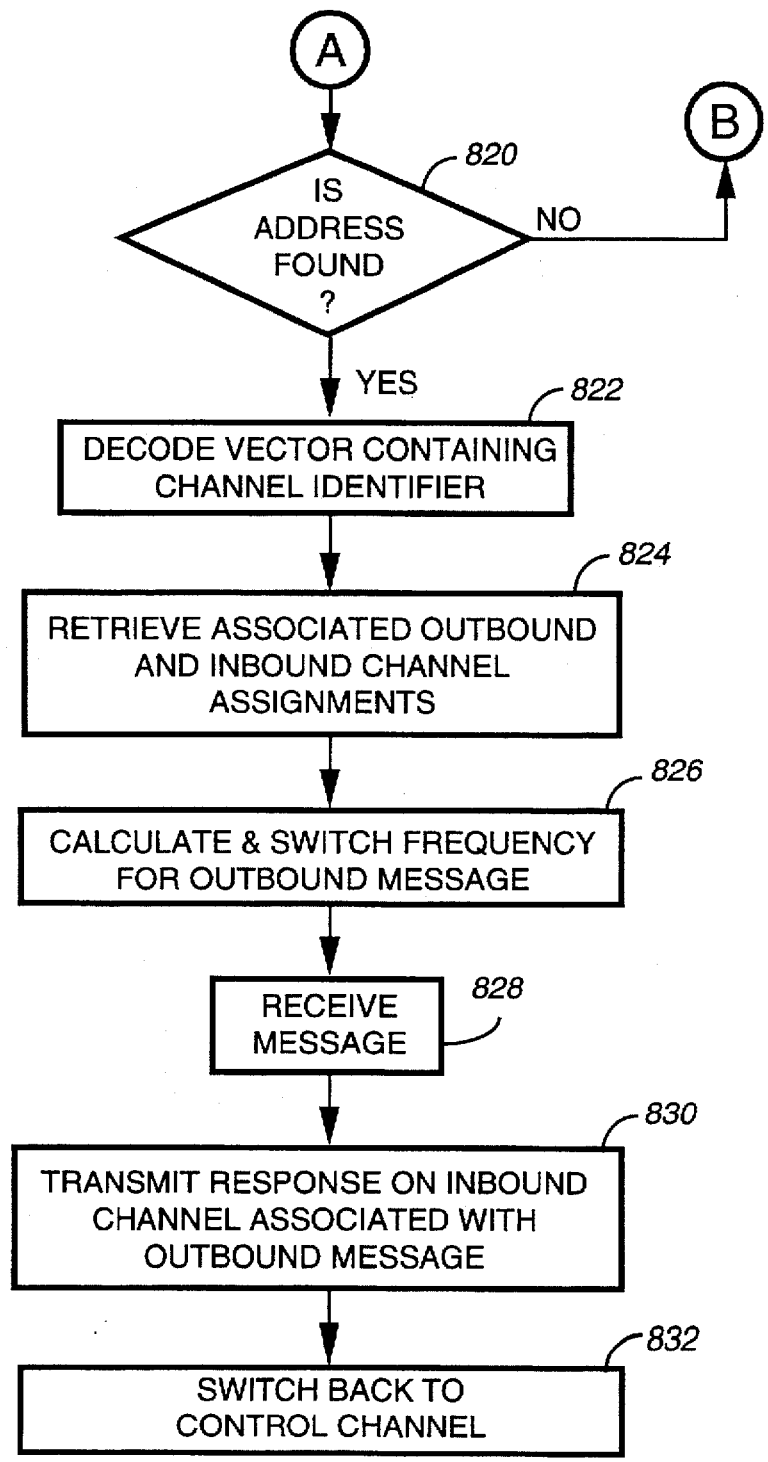

Referring to FIGS. 8 and 9, flow diagrams illustrating a method for determining available frequency for communication are shown in accordance with the preferred embodiment of the present invention. Referencing FIG. 8, upon power-up, e.g., when the subscriber unit's (selective call receiver or transceiver's) power is turned on or when the subscriber unit roams or moves to another or new geographic region, the subscriber unit retrieves a plurality of predetermined frequency channels from a scan list or frequency list, step 802. The plurality of frequencies are chosen not to be too many to destroy the battery saving features of the subscriber unit before it finds a control channel. The controller via the receive frequency synthesizer sequentially or via other logical sequences scans through the plurality of predetermined frequency channels (predetermined frequency list) to determine a control channel for receiving a signal, step 804. Step 806 checks if a valid control channel is found, and if not, the process returns to step 804 to scan to another frequency in the predetermined frequency list. If a valid control channel is found in step 806, system information including outbound and inbound channel identifiers, outbound and inbound channel assignments and active channel indicators are received, step 808. The controller associates the outbound channel identifiers with the outbound channel assignments and the inbound channel identifiers with the inbound channel assignments, step 810. The list of available frequency channels associated with the geographic region is determined based upon the active channel indicators, step 812. For example, an active channel indicator value of "01" (zero-one) represents an available channel while an active channel indicator value of "10" (one-zero) indicates an available channel in another geographic region, e.g., an adjacent geographic region, and an active channel indicator value of "00" (zero—zero) indicates a data only channel (unavailable as a control channel).

The frequency is calculated and switched, if necessary, by the receive frequency synthesizer to enable the subscriber unit to receive its address on the control channel, step 814. The subscriber unit again checks if system information is contained in the control channel, step 816, and if so, the new system information, including channel identifiers, channel assignments and active channel indicators are updated in memory, step 818. The controller thereafter checks if the current control channel was changed or modified, step 819, and if so, the process returns to step 812 for calculating or determining an available outbound frequency channel as another control channel for the current geographic region. If the current control channel was not changed in step 819 or the system information was not found, step 816, the controller looks if its address is included, step 820 of FIG. 9.

The flow diagram continues in FIG. 9, the controller checks if the address is found on the control channel, step 820. If no, the process continues to step 821 to battery save until its next preassigned frame occurs causing the process to continue to step 816 (FIG. 8) to look for system information. Alternatively, when the address is found in step 820, the controller decodes the vector field containing the outbound and possibly the inbound channel identifiers, step 822. The channel identifier is retrieved and the outbound and inbound frequencies associated with the outbound and inbound channel identifiers are retrieved to switch the receive and transmit frequency synthesizers for receiving an outbound message and transmitting an inbound message or response, step 824. The outbound frequency is calculated and passed to the receive frequency synthesizer to switch to the outbound available frequency (channel) where the outbound message will be transmitted, step 826. The outbound message is received, step 828. Any response or a user generated message is received and transmitted similarly by retrieving the inbound frequency assignment on which the acknowledgment is to be transmitted thereon. The inbound channel assignment can be determined or designated by receiving an inbound channel identifier or by retrieving the inbound channel assignment associated with the outbound channel assignment for determining an available inbound frequency channel, step 830. After the user initiated inbound message or response is transmitted, the controller switches the subscriber units to its control channel to receive system information or address, step 832.

In this way, the subscriber unit, portable communication unit or selective call receiver, receives a three bit channel identifier for specifying the outbound and possibly the inbound frequencies which are represented as eleven bit numbers. The available frequency list can be received periodically as system information which is stored in memory of the subscriber units and when the subscriber unit detects its address, it receives a vector containing the 3-bit channel identifier which is associated with the frequency assignment stored in memory to determine an available frequency or channel where the message will be received. The 3-bit inbound channel identifier specifies the frequency on which a response is to be transmitted by retrieving the inbound frequency assignment for determining or calculating the inbound available frequency or channel for transmitting the response or possibly, a user initiated message. The subscriber, when it has roamed to another or new geographic region, can receive messages on a frequency not included in the plurality of frequencies of the predetermined list of frequencies. The subscriber units therefore do not have to be reprogrammed to include changes to its preprogrammed list of frequencies or programmed with an excessive number of frequencies in its list, because it is able to receive messages on other frequencies in other geographic regions not included in the preprogrammed list of frequencies by receiving channel identifiers and associated channel assignments for determining other available frequencies.

In summary, a portable subscriber unit comprises a receive frequency synthesizer for scanning a plurality of frequencies to determine a frequency for receiving a signal and a receiver for receiving the signal representative of an available frequency associated with a geographic region. The signal comprises an outbound channel identifier and an inbound channel identifier, an outbound frequency assignment and an inbound frequency assignment, and an active channel indicator. A processor associates outbound and inbound channel identifiers with outbound and inbound frequency assignments in response to active channel indicators indicating frequency assignments corresponding to available frequencies in the geographic region. A memory stores the outbound and inbound channel identifiers associated with outbound and inbound channel assignments designating the available frequencies, and the receiver receives an address and the outbound channel identifier on the control channel. A decoder decodes the outbound channel identifier for determining an outbound available frequency where a message will be transmitted and the receive frequency synthesizer switches to the outbound frequency indicated by the outbound channel identifier for receiving the message. The processor, in response to the message being received, associates the inbound channel identifier stored in memory with the inbound frequency assignment, a transmit frequency synthesizer, coupled to the processor and the decoder, switches to an inbound frequency in response to the inbound channel identifier being received and a transmitter transmits a signal on the inbound frequency.

We claim:

1. In a portable communication unit, a method for determining available frequency channels comprising the steps of:

determining a control channel by scanning through a plurality of predetermined frequency channels for use as an active control channel for receiving the signal;

receiving the signal on the control channel representative of the available frequency channels associated with a geographic region;

storing the signal representative of the available frequency channels associated with the geographic region, the signal comprising:

a channel identifier;

a frequency assignment; and an active channel indicator indicating frequency assignments active in a current geographic region and an adjacent geographic region;

associating channel identifiers with frequency assignments in response to active channel indicators indicating that the frequency assignments correspond to the available frequency channels in the current geographic region and the adjacent geographic region;

storing the channel identifiers associated with the frequency assignments for designating the available frequency channels in the current geographic region and the adjacent geographic region;

searching for an address and the channel identifier on the control channel;

decoding the channel identifier received on the control channel designating an available frequency channel in the current geographic region where a message will be transmitted; and switching to the available frequency channel indicated by the channel identifier for receiving the message.

2. The method according to claim 1 wherein the step of searching searches system configuration information for the channel identifiers and available frequency assignments associated therewith on the control channel.

3. The method according to claim 1 wherein the step of searching searches for an address and a corresponding vector having the channel identifier on the control channel.

4. The method of according to claim 1 further comprising the steps of:

receiving and storing inbound channel identifiers and inbound frequency assignments;

determining an available inbound frequency channel in response to receiving an inbound channel identifier associated with the inbound frequency assignment; and transmitting a response on the available inbound frequency channel corresponding to the inbound frequency assignment.

5. The method according to claim 1 wherein the step of storing stores the channel identifiers and the frequency assignments indicating the available frequency channels associated with another geographic region.

6. The method according to claim 5 wherein the step of storing stores channels identifiers and frequency assignments indicating the available frequency channels associated with other geographic region being determined to be an adjacent geographic region.

7. The method according to claim 6 wherein the step of switching switches to an available frequency channel of the adjacent geographic region in response to no signals being detected on the control channel of the current geographic region before the step of determining begins scanning through the plurality of frequency channels to determine another active control channel in the current geographic region.

8. A selective call receiver, comprising:

a frequency synthesizer for scanning a plurality of frequencies to determine an active channel in a current geographic region for use as a control channel for receiving a signal;

a receiver for receiving the signal on the control channel representative of an available frequency associated with a geographic region, the signal, comprising:

a channel identifier;

a frequency assignment; and an active channel indicator indicating the frequency assignment active in the current geographic region and an adjacent geographic region;

a processor for associating the channel identifier with the frequency assignment in response to the active channel indicator indicating an available frequency of the current geographic region and the adjacent geographic region;

a memory for storing channel identifiers associated with frequency assignments designating available frequencies in the current geographic region and the adjacent geographic region;

the receiver receiving an address and the channel identifier on the control channel;

a decoder for decoding the channel identifier associated with the frequency assignment for determining the available frequency assignment in the current geographic region where a message will be transmitted; and the frequency synthesizer for switching to the available frequency assignment indicated by the channel identifier received on the control channel for receiving the message.

9. The selective call receiver according to claim 8 wherein the channel identifier is represented by fewer bits than the frequency assignment.

10. The selective call receiver according to claim 8 wherein:

the receiver receives an inbound channel identifier and an inbound frequency assignment being stored in the memory;

the processor associates the inbound channel identifier with the inbound frequency assignment;

a transmit frequency synthesizer, coupled to the processor and the decoder, switches to an inbound available frequency in response to the inbound channel identifier being received on the control channel; and a transmitter transmits a signal on the inbound available frequency designated by the channel identifier received on the control channel.

11. The selective call receiver according to claim 10 wherein the inbound channel identifier is represented by fewer bits than the inbound frequency assignment.

12. The selective call receiver according to claim 11 wherein the receiver receives the inbound channel identifier for selecting an inbound frequency associated with the inbound frequency assignment.

13. The selective call receiver according to claim 8 wherein the processor designating the channel identifier and the frequency assignment being received on the control channel as the available frequency of another geographic region in response to the active channel indicator.

14. The selective call receiver according to claim 8 wherein the receiver periodically receiving the channel identifier, the frequency assignment and the active channel indicator on the control channel for updating the available frequencies in the memory.

15. The selective call receiver according to claim 8 wherein the processor, in response to the receiver determining no signal is being received on the control channel of a current geographic region, causes the frequency synthesizer to switch to an available frequency assignment associated with another geographic region being determined to be an adjacent geographic region before scanning the plurality of frequencies to determine another active control channel in the current geographic region.

16. A portable subscriber unit, comprising:

a receive frequency synthesizer for scanning a plurality of frequencies to determine an active channel in a current geographic region for use as a control channel for receiving a signal;

a receiver, coupled to the receive frequency synthesizer, for receiving the signal on the control channel representative of an available frequency associated with a geographic region, the signal comprising:
   an outbound channel identifier and an inbound channel identifier;
   an outbound frequency assignment and an inbound frequency assignment; and
   an active channel indicator indicating the frequency assignments active in the current geographic region and an adjacent geographic region;

a processor for associating outbound and inbound channel identifiers with outbound and inbound frequency assignments in response to active channel indicators indicating outbound frequency assignments corresponding to available frequencies in the current geographic region and the adjacent geographic region, wherein when the processor determining that no signal is being received on the control channel of the current geographic region, the receive frequency synthesizer responsive to the processor switches to the available frequency assignment associated with the adjacent geographic region before the receive frequency synthesizer begins scanning the plurality of frequencies to determine another active channel in the current geographic region;

memory for storing outbound and inbound channel identifiers associated with outbound and inbound channel assignments designating the available frequencies in the geographic region wherein the outbound and inbound channel identifiers are represented by fewer bits than the outbound and inbound frequency assignments respectively;

the receiver receiving an address and at least the outbound channel identifier on the control channel;

a decoder decoding the outbound channel identifier for determining an outbound available frequency in the current geographic region where a message will be transmitted;

the receive frequency synthesizer switching to the outbound available frequency indicated by the outbound channel identifier received on the control channel for receiving the message on the available frequency;

the processor, in response to the message being received, associates the inbound channel identifier stored in memory with the inbound frequency assignment;

a transmit frequency synthesizer, coupled to the processor and the decoder, selecting an inbound frequency in response to the inbound channel identifier being received on the control channel; and a transmitter transmitting a signal on the inbound frequency.

* * * * *